United States Patent [19]

Mori

[11] Patent Number: 4,579,712
[45] Date of Patent: Apr. 1, 1986

[54] COMPOSITE MATERIAL FOR SLIDING MEMBER HAVING GRAPHITE-CONTAINING PHOSPHOR BRONZE SINTERED LAYER AND METHOD OF MANUFACTURING THE SAME

[75] Inventor: Sanae Mori, Nagoya, Japan

[73] Assignee: Daido Metal Company Limited, Nagoya, Japan

[21] Appl. No.: 553,654

[22] Filed: Nov. 21, 1983

[30] Foreign Application Priority Data

Mar. 25, 1983 [JP] Japan ................................. 58-48975

[51] Int. Cl.⁴ ............................................ B22F 7/00
[52] U.S. Cl. ........................................ 419/9; 419/11; 419/23; 419/28; 419/57; 148/11.5 P; 148/11.5 Q; 148/126.1; 428/564
[58] Field of Search .................. 148/11.5 P, 11.5 Q, 148/126.1; 419/9, 11, 28, 23, 57; 428/564

[56] References Cited

U.S. PATENT DOCUMENTS 4,505,987 3/1985 Yamada et al. .................. 75/230

FOREIGN PATENT DOCUMENTS 56-12288 3/1981 Japan .
56-11281 3/1981 Japan .

*Primary Examiner*—Stephen J. Lechert, Jr.
*Attorney, Agent, or Firm*—Sheridan Neimark; Karl W. Flocks

[57] ABSTRACT

A composite material for a sliding member has a back metal layer and a graphite-containing phosphor bronze sintered layer bonded to the back metal layer. The graphite-containing phosphor bronze sintered layer consists essentially of 0.03 to 1 wt % phosphorus, 7.5 to 16 wt % tin, 1 to 8 wt % graphite and the balance copper, and is constituted by phosphor bronze powder passing through a 200-mesh screen and a graphite powder passing through a 350-mesh screen. Also disclosed is a method of manufacturing the above-mentioned composite material for a sliding member.

7 Claims, 1 Drawing Figure

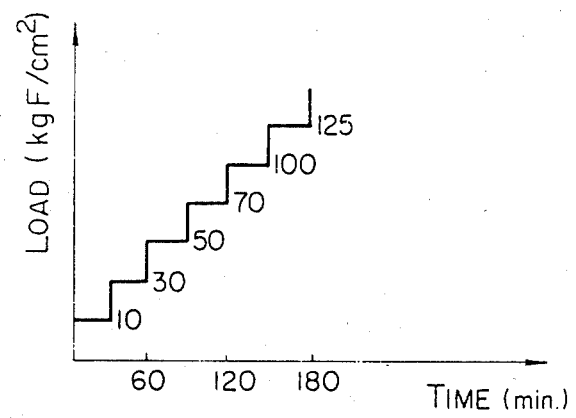

COMPOSITE MATERIAL FOR SLIDING MEMBER HAVING GRAPHITE-CONTAINING PHOSPHOR BRONZE SINTERED LAYER AND METHOD OF MANUFACTURING THE SAME

The present invention relates to a composite material for a sliding member having a graphite-containing phosphor bronze sintered layer (referred to as "sliding material", hereinafter) suitable for use as a material for bush and washer employed for bearings, and as a material for cylinder liner, piston, piston ring, oil seal, oil pump side plate, pin, collector and so forth in automobiles, industrial machinery and agricultural machinery. The invention also pertains to a method of manufacturing the above-mentioned sliding material.

A typical conventional composite material for a sliding member having a graphite-containing phosphor bronze sintered layer employs a coarse phosphor-bronze alloy powder, which pass through a 120-mesh screen (referred to as simply "−120 mesh", hereinafter), and a coarse graphite powder, which pass through a 150-mesh screen (referred to as simply "−150 mesh", hereinafter), as shown in the specifications of Japanese Patent Publication Nos. 11281/1981 and 12288/1981. Therefore, the conventional material has the following disadvantages caused due to coarseness in size:

(a) The phosphor-bronze alloy spread on a steel sheet inevitably becomes large in thickness, and the compactness of the alloy at the end of the steel sheet end portions is insufficient, so that the yield of the resultant composite material is extremely low.

(b) The bonding strength between the steel sheet and the phosphor-bronze alloy is small in value.

(c) Since the binding strength among powder particles is small, the alloy is poor in bending properties and toughness, and the bonding strength between the alloy and the steel sheet is inferior. In consequence, when the material is formed into a semicircular or cylindrical (tubular bush) bearing, for example, the alloy is apt to be cracked, or the alloy easily exfoliates from the steel sheet, disadvantageously.

Accordingly, it is a first object of the invention to provide a composite graphite-containing phosphor bronze sliding material which is high in yield in manufacturing sliding members such as bearings and is easily fabricated as well as excellent in bending property and mechanical properties such as tensile strength, bonding strength and the hardness of the alloy layer as well as seizure resisting property, all of which are extremely important for a sliding material, thereby to overcome the above-mentioned disadvantages of the prior art.

To this end, according to one aspect of the invention, there is provided a sliding material having a back metal layer and a graphite-containing phosphor bronze sintered layer bonded to the back metal layer, the graphite-containing phosphor bronze sintered layer consisting essentially of 0.03 to 1 wt % phosphorus, 7.5 to 16 wt % tin, 1 to 8 wt % graphite and the balance copper, and being constituted by phosphor bronze powder passing through a 200-mesh screen and a graphite powder passing through a 350-mesh screen.

It is a second object of the invention to provide a method of manufacturing the above-mentioned sliding material.

To this end, according to another aspect of the invention, there is provided a method of manufacturing a sliding material, the method comprising the steps of: providing a phosphor-bronze alloy powder which is passed by a 200-mesh screen and a graphite powder which is passed by a 350-mesh screen; providing a mixed powder having a composition consisting essentially of 0.03 to 1 wt % phosphorus, 7.5 to 16 wt % tin, 1 to 8 wt % graphite and the balance copper by mixing the phosphor-bronze alloy powder and the graphite powder; spreading the mixed powder on a back metal layer and then sintering the mixed powder to form a composite layer; and rolling the composite layer constituted by the sintered mixed powder layer and the back metal layer to form a composite material for a sliding member having a predetermined thickness.

The following is the explanation of the reasons for the limitation on the content range of each of the components of the mixed powder constituted by the phosphor-bronze alloy powder and the graphite powder employed in the invention, and the limitation on the particle size of each of the powders.

(a) Phosphorus (P): 0.03 to 1 wt %

A phosphorus content less than 0.03 wt % is not sufficient for obtaining a satisfactory strength. On the other hand, a phosphorus content in excess of 1 wt % is apt to cause segregation when the powder is produced, and deteriorates mechanical properties, particularly toughness. Preferably, the phosphorus content falls between 0.05 and 0.5 wt %.

(b) Tin (Sn): 7.5 to 16 wt %

A tin content less than 7.5 wt % lowers strength and deteriorates wear resistance, while a tin content in excess of 16 wt % makes the alloy brittle. The tin content preferably falls within the range between 9 to 13 wt %.

(c) Graphite (Gr): 1 to 8 wt %

A graphite content less than 1 wt % is not sufficient for obtaining a satisfactory lubricating effect. On the other hand, a graphite content in excess of 8 wt % extremely lowers the alloy strength to deteriorate the flexural properties of the alloy. Preferably, the graphite content falls between 1.5 to 5 wt %.

(d) The particle size of the phosphor-bronze alloy powder:

If the particle size of the phosphor-bronze alloy powder is coarser than −200 mesh, the alloy is inferior in bending property, and moreover the tensile strength of the phosphor-bronze alloy and the bonding strength between the steel back metal layer and the alloy layer are lowered.

(e) The particle size of the graphite powder:

If the particle size of the graphite powder is coarser than −350 mesh, the object of the invention cannot be attained owing to the nonuniform distribution thereof and etc.

It is to be noted that the term "−200 mesh" used in the invention means that at least 95% of the whole particles pass through a 200-mesh screen. Moreover, the term "−350 mesh" means that at least 95% of the whole particles pass through a 350-mesh screen.

The attached sole FIGURE shows the load application condition in a seizure test performed on the sliding material in accordance with the invention.

The invention will be described hereinunder in greater detail with reference to the following examples.

EXAMPLE 1

A phosphor-bronze alloy powder of −200 mesh and a graphite powder of −350 mesh were mixed together to obtain a mixed powder (the composition: 0.25 wt % P—10.6 wt % Sn—4 wt % graphite—the balance Cu).

The mixed powder was spread, with a thickness of 1.0 mm, on an ordinary structural carbon steel sheet 1.36 mm thick coated with copper to a thickness of 8 microns by the conventional electroplating method, and was sintered in a furnace under a hydrogen (in a state of gas flow) reducing atmosphere at 700° to 900° C. for 10 to 30 minutes. Thereafter, the sintered composite material was passed through rolls to roll the former with a reduction rate of 5 to 20% so that the sintered mixed powder and the steel sheet would be pressure-bonded together, thereby obtaining a composite graphite-containing phosphor bronze sliding material having an overall thickness of 1.6 mm and a bimetal-like shape with the graphite containing phosphor-bronze alloy layer, 0.4 mm thick, formed by sintering the mixed powder of phosphor bronze and graphite. The bending property and mechanical properties (the tensile strength, the bonding strength between the steel back metal and the graphite-containing phosphor-bronze sintered alloy, and the hardness of the alloy) of the obtained sliding material are shown in Table. Moreover, the results of a seizure test performed as a bearing performance test are shown in Table 2. The test conditions on the seizure test are shown in Table 3. It is to be noted that it is, as a matter of course, possible to provide a step of repeating the above-mentioned sintering and rolling by a required number of times according to need. In addition, as a material for the deposition layer formed by plating, it is possible to employ nickel or zinc.

For comparison with the sliding material in accordance with the invention, a conventional sliding material in accordance with the prior art was produced and tested as follows.

EXAMPLE 2

A conventional phosphor-bronze alloy powder of −120 mesh and a graphite powder of −150 mesh were mixed together to form a mixed powder (the composition: 0.25 wt % P—7 wt % Sn—4 wt % graphite—the balance Cu). Then, a conventional composite graphite-containing phosphor bronze sliding material was obtained under the same manufacturing conditions as those in the Example 1. The flexural properties and mechanical properties of the conventional sliding material in accordance with the prior art are shown in Table 1, and the results of a seizure test are shown in Table 2.

It is to be noted that the flexural property test was carried out as follows: The bimetal-like sliding material constituted by the steel back metal layer and the sintered phosphor-bronze alloy layer was bent 180° so that both half portions of the surface of the steel back metal layer may come in contact with each other, and if a cracking produced in the alloy layer by the bending was large, the material was evaluated to be bad in bending property; if the cracking was small the material was evaluated to be good in bending property.

Moreover, each of test pieces used in the seizure test was formed as follows: The surface of the alloy layer of the bimetal-like sheet material obtained in each Example was subjected to a diamond-indenting process (a process for providing a diamond-shaped recess) to form a diamond-shaped recess having a depth of 0.4 mm and two diagonal lengths of 3 mm and 5 mm. Then, the sheet material was fabricated into a tubular bush bearing having an outside diameter of 23 mm, a width of 20 mm and a wall thickness of 1.5 mm. Each test piece prepared in such bush bearing is subjected to three times of seizure tests under the test conditions shown in Table 3. The results of the tests are shown in Table 2.

It is to be noted that in the above test conditions the shape of the indent (diamond-shaped recess) formed in the surface of the alloy of the tubular bush bearing is not limited to diamond shape but other shape may be employed, e.g., a ball-shaped indent (a hemispherical recess). As a lubricant filled in the indented portion, such a viscous semisolid lubricant as grease, as in the case of the above Examples, is not limitative and a solid lubricant, such as graphite and $MoS_2$, may be employed. In addition, although in Examples the indent was formed in the surface of the bearing alloy layer, the indent may not be necessary to provide according to the use.

The test for the bonding strength between the back metal layer and the phosphor-bronze alloy layer were effected as follows: From the sliding material produced according to each Example, a composite sliding alloy sheet (bimetal-like sheet) having a width of B (mm) was sampled, and two parallel grooves spaced apart each other were cut in the sliding alloy sheet, one extending from the outer surface on the sliding alloy side to the bonding interface thereof and the other from the outer surface on the back metal side to this bonding interface thereof, the distance between the spaced grooves being represented by L (mm). Then, both ends of the test piece were gripped and pulled in opposite directions, and a tensile load (kg) measured when the back metal and the sliding alloy portion broke up from each other was divided by a bonded part area, $B \times L$ (mm$^2$) In Examples, B was 3 mm, and L was 3 mm.

As will be obvious from Tables 1 and 2, it has been confirmed that the material in accordance with the invention is excellent in bending property and much superior than the prior art material in mechanical properties such as tensile strength, the bonding strength between the alloy and the steel back metal and the hardness of the alloy, as well as with respect to the results of the seizure test (i.e., seizure resistance). In the seizure resistance evaluating test the results of which are shown in Table 2, the sliding material in accordance with the invention caused no seizure under a surface pressure of about 120 kg/cm$^2$, while the sliding material in accordance with the prior art caused a seizure under a surface pressure of 70 kg/cm$^2$ or 100 kg/cm$^2$.

As has been described, the composite graphite-containing phosphor bronze sliding material in accordance with the invention employs powders of particles much finer than those of the graphite powder and phosphor-bronze alloy powder employed in the prior art. Therefore, the thickness of the powder material disposed on a steel sheet will not be large, and the alloy can be made satisfactorily compact at the end portions of the steel sheet, so that the material can be improved in yield. Moreover, the material has a bending property so excellent that even when the material is fabricated into a semicircular or cylindrical (tubular bush) bearing, there is no fear of any cracking or exfoliation between the alloy layer and the steel back metal. Thus, the material has been greatly improved in mechanical properties, such as the tensile strength, the bonding strength between the alloy layer and the steel back metal and the hardness of the alloy layer, as well as the seizure resistance.

TABLE 1

| Kind | Used powders (particle size: mesh) | Bending property | Tensile strength (kg/mm$^2$) | Bonding strength between steel back metal and alloy layer (kg/mm$^2$) | Hardness of alloy layer (Hv) | Product shape |
| --- | --- | --- | --- | --- | --- | --- |
| Conventional material | P—Sn—Cu + graphite (−120 mesh) (−150 mesh) 0.25% P—7% Sn—4% graphite balance Cu | Cracking: large | 7.8 | 6.1 | 55.0 | Bimetal-like sheet |
| Material of the present invention | P—Sn—Cu + graphite (−200 mesh) (−350 mesh) 0.25% P—10.6% Sn—4% graphite-balance Cu | Cracking: small | 12.0 | 9.4 | 59.0 | Bimetal-like sheet |

TABLE 2

| Kind | Tubular bush bearing obtained by forming bimetal-like sheet into cylindrical shape | Maximum seizing pressure (kg/cm$^2$) |
| --- | --- | --- |
| Conventional material | P—Sn—Cu + graphite (−120 mesh) (−150 mesh) Composition: 0.25% P—7% Sn—4% graphite-balance Cu | 1: up to ~100 (occurrence of seizure)<br>2: up to ~70 (occurrence of seizure)<br>3: up to ~100 (occurrence of seizure) |
| Material of the invention | P—Sn—Cu + graphite (−200 mesh) (−350 mesh) Composition: 0.25% P—10.6% Sn—4% graphite balance Cu | 1: up to 150, no seizure<br>2: up to 150, no seizure<br>3: up to 150, no seizure |

TABLE 3

| | |
| --- | --- |
| Number of revolutions of shaft | 478 r.p.m. |
| Shaft speed | 0.5 m/sec. |
| Lubrication | Grease applied in assembly |
| Atmospheric temperature | Room temperature |
| Shaft material | JIS s55c (corresponding to AISI 1055) structural carbon steel |
| Load | Cumulative loading method (load was increased with elapse of time as shown in the Drawing) |
| Seizure evaluating method | Load was measure when temperature of bearing rear surface exceeded 200° C. |

What is claimed is:

1. A composite material for a sliding member having a back metal layer and a graphite-containing phosphor bronze sintered layer bonded to said back metal layer, said graphite-containing phosphor bronze sintered layer consisting essentially of 0.03 to 1 wt % phosphorus, 7.5 to 16 wt % tin, 1 to 8 wt % graphite and the balance copper, and being constituted by phosphor bronze powder passing through a 200-mesh screen and a graphite powder passing through a 350-mesh screen.

2. A composite material for a sliding member according to claim 1, wherein said back metal layer is a steel strip or a steel strip plated with copper or a copper-base alloy layer.

3. A composite material for a sliding member according to claim 1 which is used for a bearing material.

4. A method of manufacturing a composite material for a sliding member, said method comprising the steps of:

providing a phosphor-bronze alloy powder which pass through a 200-mesh screen and a graphite powder which pass through a 350-mesh screen;

providing a mixed powder having a composition consisting essentially of 0.03 to 1 wt % phosphorus, 7.5 to 16 wt % tin, 1 to 8 wt % graphite and the balance copper by mixing said phosphor-bronze alloy powder and said graphite powder;

disposing said mixed powder on a back metal layer and then sintering said mixed powder to form a composite layer; and rolling said composite layer constituted by said sintered mixed powder layer and said back metal layer to form a composite material for a sliding member having a predetermined thickness.

5. A method of manufacturing a composite material for a sliding member according to claim 4, wherein said back metal layer is a steel sheet or a steel sheet having a layer plated with copper or a copper-base alloy.

6. A method of manufacturing a composite material for a sliding member according to claim 4, wherein said sintering is effected in a reducing atmosphere at a temperature of 700 to 900° C. for 10 to 30 minutes.

7. A method of manufacturing a composite material for a sliding member according to claim 4, wherein said rolling is effected with a reduction rate of 5 to 20%.

* * * * *